ial of Letters Patent.
UNITED STATES PATENT OFFICE.

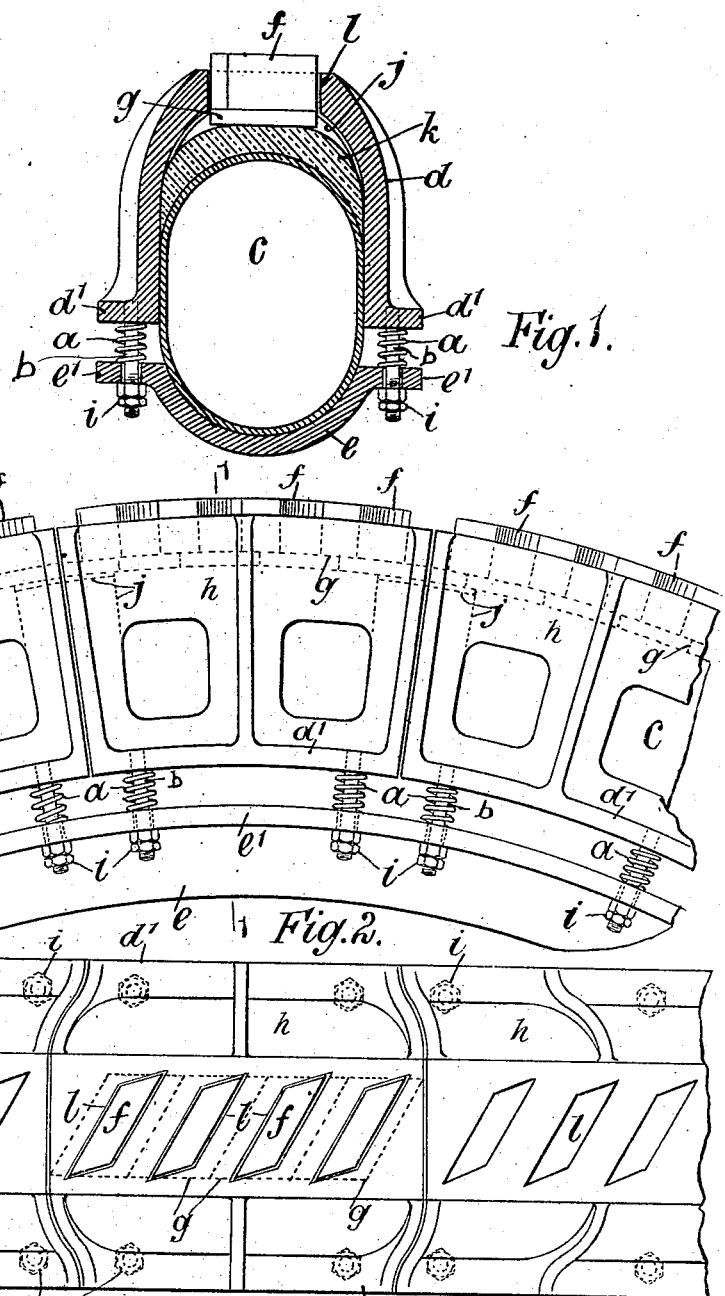

SAMUEL MACKENZIE BROWN, OF HIGH ROAD, WOOD GREEN, ENGLAND.

WHEEL FOR ROAD-VEHICLES.

935,245. Specification of Letters Patent. Patented Sept. 28, 1909.

Application filed May 23, 1908. Serial No. 434,638.

*To all whom it may concern:*

Be it known that I, SAMUEL M. BROWN, a subject of the King of Great Britain, residing at 327 High road, Wood Green, in the county of Middlesex, England, have invented certain new and useful Improvements in Wheels for Road-Vehicles, of which the following is a specification.

This invention relates to vehicle wheels of the type in which an elastic tire is provided with a sectional wearing tread, the sections of which are retained in position by a system of spring connections.

In the accompanying drawings, Figure 1 is a cross section taken on the line 1—1 of Fig. 2; Fig. 2 is a side elevation of part of a wheel constructed according to my invention; and Fig. 3 is a plan of Fig. 2.

The method of attaching the metal covering is by the following means, viz., with the bolts $b$ and the springs $a$ all around on each side of the pneumatic tire $c$ passed through or secured to the protruding rim $d'$ on each side of the outer metal covering $d$ and fastened to the protruding parts of the rim $e$ in which the pneumatic tire $c$ is fixed, i. e., the rim which forms the bed of the pneumatic tire; the metal springs $a$, if used, being fixed by means of the bolts $b$ between the outer metal cover $d$ and the inner rim $e$ (or rim in which the spokes of the wheels are fixed). The bolts $b$ are fixed firmly by means of nuts, or braced in the outer cover of metal $d$, but allowed free play where they run through the flange $e'$ of the inner rim $e$, so that the springs and bolts have free play to move up or down according to the pressure on the pneumatic tire $c$ that is placed in between the two coverings of metal, viz., the outer metal cover $d$ and the inner rim $e$. The outer metal cover is lined inside with felt or any other soft material $k$ to prevent friction on the pneumatic tire $c$. The outer cover of metal $d$ is divided into four or more parts, and joined together by means of pieces of leather or other flexible material $j$, so that the outer covering of metal when the wheel is running can be pressed on to the inner pneumatic tire $c$ without bending the outer metal cover.

The manner in which the sections of the outer metal cover $d$ are connected is by means of leather, rubber, or like material $j$ being stuck or fastened underneath the ends of each metal section. This is to prevent dirt getting through to the inner pneumatic tire between the sections. There are oblique apertures made in the outer metal cover $d$, through which solid pieces or studs of rubber $f$ or like material project from within, and which studs have wide bases $g$ to prevent them from slipping through the holes $l$ and which project so that the wheels run on the projecting studs or pieces of rubber, or like material $f$ instead, of on the metal cover $d$. These studs or pieces $f$ may be fixed to the inside of the metal cover $d$ by means of a sticky adherent or said pieces $f$ can be placed in their proper position without the use of such adherent, for the pressure of the outer metal cover $d$ on to the inner pneumatic tire $c$ is sufficient to keep them in position when the pneumatic tire is properly inflated.

Figure 1 represents a cross section of the tire showing the springs $a$ and the bolts $b$ at each side of the pneumatic tire $c$ within the outer metal cover $d$, and the inner rim $e$, to which the spokes are attached, also an outer metal cover $d$, with rubber or other material as studs $f$, fixed therethrough with the enlarged base $g$ of the studs inside of the outer metal cover $d$, to which they are stuck or fixed. The springs $a$ can be dispensed with at will.

Fig. 2 shows a side elevation of part of the tire, with the bolts $b$, the nuts $j$ and the springs $a$ which hold the sections of the outer metal cover $d$ to the inner rim $e$, in which the spokes are fixed. Studs $f$ of rubber or other material are stuck or fixed through the outer metal cover $d$. The springs $a$ can be dispensed with at will.

Fig. 3 is a plan of the outer metal cover $d$, showing the divisions $h$, of the same, and the nuts $j$, and the studs $f$ of rubber or other material. This is the outer portion of the tire which will come into contact with the road.

Having thus fully described my invention, what I claim and desire to secure by Letters Patent is:—

1. A wheel for road vehicles comprising a rim having lateral flanges, a pneumatic tire seated in the rim, an outer metal cover made in sections connected together by flexible material, lateral flanges on each section, bolts securing said section flanges to the rim flanges, the metal cover sections having apertures disposed obliquely to the direction of travel, and resilient blocks with enlarged bases fitted in said apertures in the manner set forth.

2. A wheel for road vehicles comprising a rim having lateral flanges, a pneumatic tire seated in the rim, an outer metal cover made in sections connected together by flexible material, lateral flanges on each section, bolts securing said section flanges to the rim flanges, springs mounted on said bolts and bearing on said flanges, the metal cover sections having apertures therein disposed obliquely to the direction of travel, and resilient blocks with enlarged bases fitted in said apertures with their bases resting on a lining of felt within the outer metal cover and bearing on the pneumatic tire, substantially as described.

In testimony whereof I have hereunto set my hand in presence of two subscribing witnesses this 14th day of May 1908.

SAMUEL MACKENZIE BROWN.

Witnesses:
F. W. GOLBY,
D. G. BROWN.